United States Patent [19]
Barth et al.

[11] Patent Number: 5,746,560
[45] Date of Patent: May 5, 1998

[54] FASTENER HAVING TORQUE-ABSORBING RIBS

[75] Inventors: Gerald D. Barth, South Elgin; Frank W. Bechtel, Hanover Park, both of Ill.

[73] Assignee: Illinois Tool Works Inc., Glenview, Ill.

[21] Appl. No.: 829,349

[22] Filed: Mar. 31, 1997

[51] Int. Cl.⁶ .................... F16B 39/00; A44B 21/00
[52] U.S. Cl. ................... 411/188; 411/161; 411/959; 24/514
[58] Field of Search ............... 24/514, 525, 569; 411/188, 161, 959

[56] References Cited

U.S. PATENT DOCUMENTS

| | | | |
|---|---|---|---|
| 2,147,209 | 2/1939 | Olson | 411/187 |
| 2,959,204 | 11/1960 | Rigot | 411/186 |
| 3,370,631 | 2/1968 | James | 411/959 |
| 4,220,188 | 9/1980 | McMurray | 411/188 |
| 4,808,050 | 2/1989 | Landt | 411/959 |
| 5,183,359 | 2/1993 | Barth | 411/161 |

FOREIGN PATENT DOCUMENTS 2908-499  9/1980  Germany .

*Primary Examiner*—Victor N. Sakran
*Attorney, Agent, or Firm*—Dressler, Rockey, Milnamow & Katz, Ltd.

[57] ABSTRACT

A faying plate having a clearance hole is fastened to a tapping plate having a tapping hole by a fastener having a shank with a tapered tip and with a self-tapping thread. The shank, which defines an axis, is adapted to tap a complementary thread around the tapping hole, via the self-tapping thread, when the fastener is driven rotatably. The fastener has a unitary head with a bearing portion having a peripheral edge and a having surface facing the shank, flaring outwardly toward the shank, and frusto-conical at a conical angle of about 5° relative to a plane perpendicular to the axis. Eight torque-absorbing ribs project from the clamping surface, are spaced at regular intervals about the axis, and have ridges that lie on an imaginary, frusto-conical surface flaring outwardly toward the shank at a conical angle of about 1° relative to a plane perpendicular to the axis and at a conical angle of about 4° relative to the clamping surface. Each rib has a depth from not less than 0.0001 inch to about 0.0054 inch at the peripheral edge of the bearing portion.

11 Claims, 2 Drawing Sheets

FASTENER HAVING TORQUE-ABSORBING RIBS

TECHNICAL FIELD OF THE INVENTION

This invention pertains to a fastener of a type employed to fasten two sheet-metal plates to each other. The fastener has a shank, which has a thread, and a head, which is unitary with the shank. The shank may include a shoulder. The head has a bearing portion having a clamping surface. This invention contemplates that the fastener has a unique arrangement of torque-absorbing ribs projecting from the clamping surface of the head.

BACKGROUND OF THE INVENTION

A fastener of the type noted above is used for fastening a sheet-metal plate, which may be conveniently called a faying plate, to another sheet-metal plate, which may be conveniently called a tapping plate. Commonly, the faying plate is pre-punched with a hole that may be conveniently called a clearance hole and the tapping plate is pre-punched with a hole that may be conveniently called a tapping hole, the tapping hole being smaller than the clearance hole. Commonly, the shank is adapted to pass freely through the clearance hole, to enter the tapping hole at a tapered tip, and to tap a complementary thread around the tapping hole, via the self-tapping thread, when the fastener is driven.

Among other data characterizing a fastener of the type noted above, it is convenient to refer to a tapping torque, which is the torque required for the self-tapping thread to tap the complementary thread when the fastener is driven rotatably. Moreover, it is convenient to refer to a stripping torque, which is the torque required for the self-tapping thread to strip the complementary thread so that the shank rotates freely within the tapping hole.

Commonly, fasteners of the type noted above are produced in large quantities, from which statistically meaningful samples are drawn for testing. Among other data obtainable from testing of any given sample, it is convenient to refer to a statistical maximum tapping torque, which is the maximum torque required for the self-tapping thread of any of the tested fasteners of the sample to tap such a complementary thread. Moreover, it is convenient to refer to a statistical minimum stripping torque, which is the torque required for the self-tapping thread of any of the tested fasteners of the sample to strip the complementary thread so that the shank rotates freely within the tapping hole.

In many applications, such fasteners are driven via pneumatically or electrically powered driving tools, each of which is arranged to apply a driving torque to a fastener head. Desirably, each such tool is adjusted so as to stall or so as to stop driving when a nominal maximum driving torque is applied, which is higher than the statistical maximum tapping torque for such fasteners and lower than the statistical minimum stripping torque for such fasteners. Since such tools tend to be imprecisely adjustable, it is desirable for the statistical minimum stripping torque to be substantially higher than the statistical maximum tapping torque for any given quantity of threaded fasteners of the type noted above.

As exemplified in Barth U.S. Pat. No. 5,183,359, it is known to provide a fastener of the type noted above with anti strip-out ribs projecting from a clamping surface of the head and spaced regularly about an axis defined by the shank. The ribs exemplified in the Barth patent tend to cut aggressively into the underlying surfaces of the faying plates underlying the heads. Consequently, fasteners similar to the fastener exemplified in the Barth patent are unsatisfactory for some applications, particularly but not exclusively for some applications wherein the faying plates underlying the heads are pre-finished and wherein visible signs of surface damage due to scraping of the underlying surface of the faying plate or to corrosion of the scored surface are unacceptable.

SUMMARY OF THE INVENTION

This invention provides a unique arrangement of torque-absorbing ribs in a fastener for fastening a faying plate, which may be prepared with a clearance hole to a tapping plate, which may be prepared with a tapping hole smaller than the clearance hole. The faying plate has a faying surface and an opposite surface, which faces the tapping plate.

The fastener has a shank with a tapered tip, which may have a rounded end. The shank, which defines an axis of the fastener, has a thread extending along and around the shank. The shank may have a shoulder, which may be unthreaded.

The fastener has a head, which is unitary with the shank. The head has a driving portion and a bearing portion adjoining the shank. The driving portion is adapted to be rotatably driven so as to drive the fastener rotatably about the axis defined by the shank. The bearing portion has a peripheral edge, which is annular, and a clamping surface facing the shank. Flaring outwardly toward the shank, the clamping surface is frusto-conical, preferably at a conical angle of about 5° relative to a plane perpendicular to the axis defined by the shank.

In the unique arrangement of torque-absorbing ribs, preferably eight such ribs, the ribs project from the clamping surface of the bearing portion and which are spaced regularly about the axis defined by the shank. Each rib has a leading flank and a trailing flank, preferably with the leading and trailing flanks defining a flank angle of about 90° and with the leading and trailing flanks defining a ridge extending in a radial plane.

According to a first aspect of this invention, the ridges of the ribs lie on an imaginary, frusto-conical surface flaring outwardly toward the shank at a conical angle of about 1° relative to a plane perpendicular to the axis defined by the shank.

According to a second aspect of this invention, each rib has a depth not less than about 0.0001 inch when measured from the clamping surface of the bearing portion to the ridge of said rib, in a plane comprising the axis defined by the shank, at the peripheral edge of the bearing portion.

Advantageously, for any given quantity of fasteners embodying the first and second aspects of this invention, the statistical minimum stripping torque proves to be substantially higher than the statistical maximum tapping torque.

These and other objects, features, and advantages of this invention are evident from the following description of a preferred embodiment of this invention, with reference to the accompanying drawings.

DETAILED DESCRIPTION OF THE PREFERRED EMBODIMENT

Figure 1:
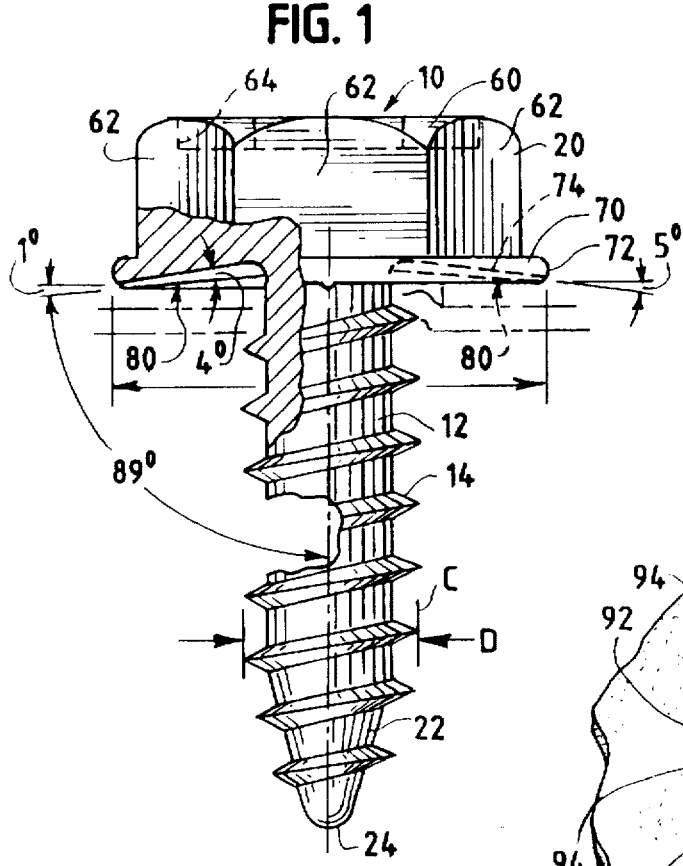
FIG. 1 a partly broken away, elevational view of a fastener constituting a preferred embodiment of this invention.
Figure 3:
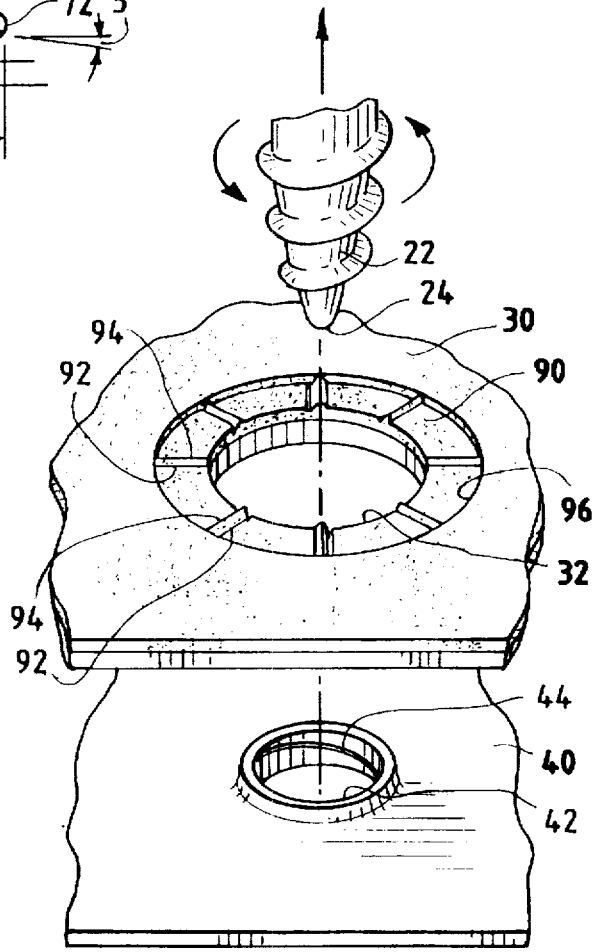
FIG. 3 is a partly fragmentary, exploded, perspective view of the fastener shown in FIGS. 1 and 2, along with a faying plate and a tapping plate, as seen with the fastener removed after having been driven so as to fasten the faying plate and the tapping plate to each other and with the faying plate lifted from the tapping plate.
Figure 2:
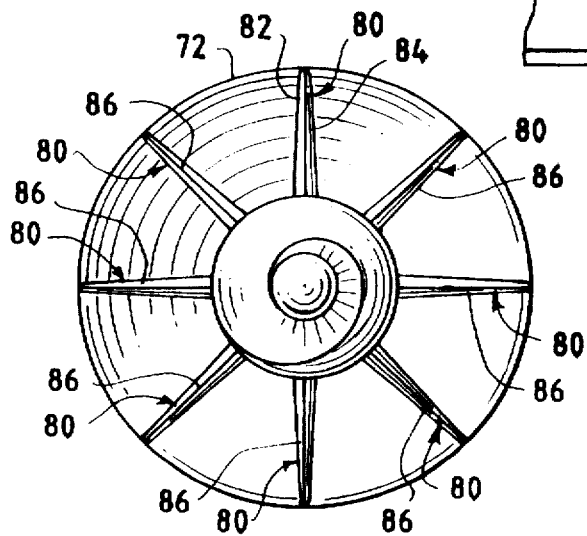
FIG. 2 is an axial view of the fastener shown in FIG. 1, as seen from its pointed end.

As shown in FIGS. 1, 2, and 3, a fastener 10 of the type noted above constitutes a preferred embodiment of this invention. The fastener 10 has a shank 12, which has a self-tapping thread 14, and a head 20, which is unitary with the shank 12. The shank 12, which defines an axis of the fastener 10, has a tapered tip 22, which has a rounded end 24. In other embodiments (not shown) contemplated by this invention, the shank of the fastener may have a different thread, such as a drilling thread or a machine thread and may have other features outside the scope of this invention, such as an unthreaded shoulder. The precise shape of the shank and the precise shape of the thread are outside the scope of this invention.

As shown in FIG. 3, the fastener 10 is employed for fastening a faying plate 30, which is prepared, as by punching, with a clearance hole 32, to a tapping plate 40, which is prepared, as by punching, with a tapping hole 42. Before the fastener 10 is driven, the clearance hole 32 and the tapping hole 42 are circular, the clearance hole 32 having a comparatively larger diameter and the tapping hole 42 having a comparatively smaller diameter. When the fastener 10 is driven rotatably, the shank 12 is adapted to pass freely through the clearance hole 32, to enter the tapping hole 42 at the tapered tip 22, and to tap a complementary thread 44 around the tapping hole, via the self-tapping thread 14. In an embodiment (not shown) in which the shank of the fastener has a drilling thread, as mentioned above, the faying plate may not be not prepared with a clearance hole and the tapping plate may not be prepared with a tapping hole.

As shown, the head 20 has a driving portion 60 with a hexagonal shape defining tool-engaging flats 62 and with a hexagonal socket 64 whereby the driving portion 60 is adapted to be rotatably driven by a pneumatically powered driving tool (not shown) of a conventional type having a driving head coacting with the tool-engaging flats 62 or with the hexagonal socket 64 so as to drive the fastener 10 rotatably about the axis defined by the shank 12. In other embodiments (not shown) contemplated by this invention, the head of the fastener may have a different shape, such as a truss or dome shape. Except as explained herein, the precise shape of the head is outside the scope of this invention.

The head 20 has a bearing portion 70 adjoining the shank 12, having an annular, peripheral edge 72, and having a clamping surface 74 facing the tapered tip 22 of the shank 12. The clamping surface 74, which flares outwardly toward the tapered tip 22 of the shank 12, is frusto-conical and defines a conical angle of about 5° relative to a plane perpendicular to the axis defined by the shank 12.

The clamping surface 74 has eight essentially identical, torque-absorbing ribs 80, which project from the clamping surface 74, toward the shank 12, and which are spaced at regular intervals about the axis defined by the shank 12. Each rib 80 narrows progressively as such rib 80 extends from the shank 12 to the peripheral edge 72 of the bearing portion 70. Each rib 80 has a leading flank 82 and a trailing flank 84, which trails the leading flank 82 when the fastener 10 is driven for fastening the faying plate 30 and the tapping plate 40 to each other. The leading flank 82 and the trailing flank 84 define a flank angle of about 90° and define a ridge 86 extending in a radial plane. In other embodiments (not shown) contemplated by this invention, a different number of such ribs may project from the clamping surface.

The ridges 86 lie on an imaginary, frusto-conical surface flaring outwardly from the shank 12, toward the tapered tip 22 of the shank 12, defining a conical angle of about 1° relative to a plane perpendicular to the axis defined by the shank 12, and defining a conical angle of about 4° relative to the clamping surface 74. The fastener 10 is manufactured so that each rib 80 extends fully from the shank 12 fully to the peripheral edge 72 of the bearing portion 70 and so that each rib 80 has a depth not less than about 0.0001 inch when measured from the clamping surface 74 to the ridge 86 of such rib 80, in a plane comprising the axis defined by the shank 12, at the peripheral edge 72 of the bearing portion 70.

With reference to FIG. 1, the diameter of the bearing portion 70 may be conveniently called the nominal bearing diameter H of the fastener 10, and the diameter of an imaginary cylinder C comprising the crest of the thread 14 (except at the tapered tip 22) may be conveniently called the basic screw diameter D of the fastener 10.

For the conical angles indicated in FIG. 1 and described above, and when measured at the same cylinder C, the minimum depth of the clamping surface 74 is given by the formula $0.5 (H-D) \tan 5°$ and the minimum depth of each rib 80 is given by the formula $0.5 (H-D) (\tan 5° - \tan 1°)$. As a practical example, for H being about 0.384 inch and D being about 0.190 inch, the depth of the clamping surface 74 when measured thereat is about 0.0085 inch and the minimum depth of each rib 80 when measured thereat is about 0.0068.

Advantageously, when the fastener 10 is driven so as to fasten the faying plate 30 and the tapping plate 40 to each other, the ribs 80 do not tend to cut aggressively into the underlying surface of the faying plate 30. Rather, as shown in FIG. 3 with the fastener 10 removed after having been so driven and with the faying plate 30 lifted from the tapping plate 40, the ribs 80 tend to work the surface metal of the faying plate 30 so as to form a generally annular depression 90 similar to a counterbore but having eight depressed, radially extending grooves 92, eight raised, radially extending ridges 94, with a raised, circumferential ridge 96. Each ridge 94 closely precedes a respective one of the grooves 92 in a rotational sense corresponding to rotation of the fastener 10 when so driven.

Figure 4:
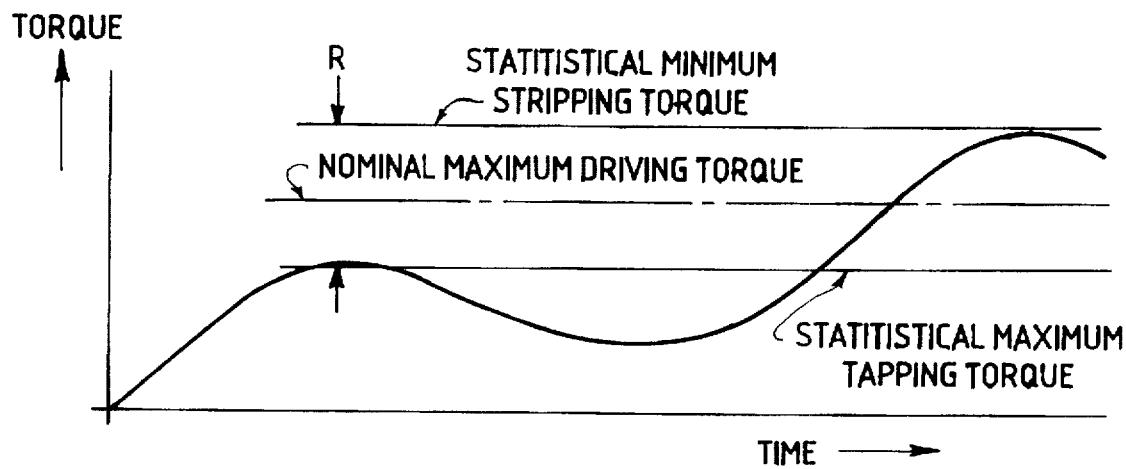
FIG. 4 is a graphical representation of various types of torque versus time for a quantity of fasteners similar to the fastener shown in FIGS. 1, 2, and 3 and for a pneumatically powered driving tool, which is not shown.

As represented graphically in FIG. 4, when fasteners in a sample drawn from a production quantity of fasteners similar to the fastener 10 are tested, a wide range R is found to exist between the statistical maximum tapping torque of the tested fasteners and the statistical minimum stripping torque of the tested fasteners. The wide range R enables a pneumatically or electrically powered driving tool (not shown) of a conventional type to be readily adjusted so that its nominal maximum driving torque exceeds the statistical maximum tapping torque of the tested fasteners but does not exceed the statistical minimum stripping torque of the tested fasteners, even if such tool cannot be precisely adjusted, whereby it is predictable within a range of statistically determinable errors that such tool can drive all fasteners in the production quantity without stripping the complementary threads tapped by any fasteners in the production quantity.

Figure 5:
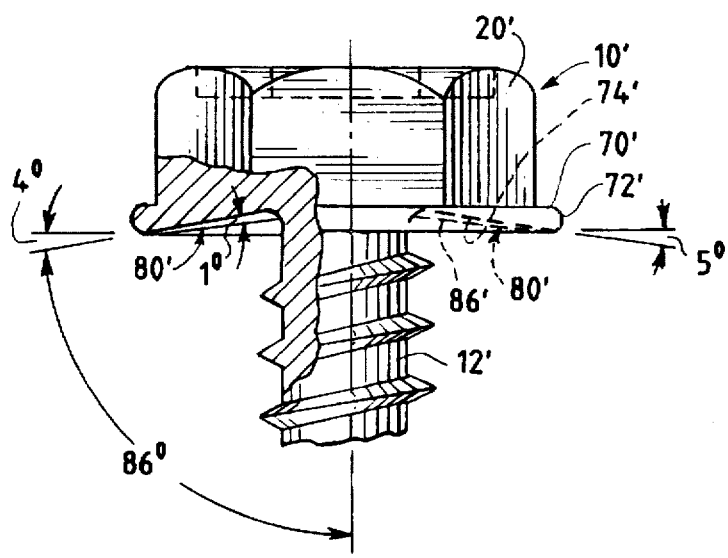
FIG. 5 is a fragmentary view analogous to FIG. 1 but showing a fastener admitted to constitute prior art.

Superiority of the fastener 10 over prior fasteners is evident when the fastener 10 is compared to a fastener 10'0 shown in FIG. 5, constituting prior art, and exemplifying certain fasteners sold heretofore by ITW-Shakeproof (a division of Illinois Tool Works Inc.) of Elgin, Ill. Reference numbers with primes are used in FIG. 5 to refer to elements that are similar, except as shown and described, to elements referenced by similar numbers without primes in FIGS. 1, 2, and 3.

The fastener 10' has a shank 12', which defines an axis of the fastener 10' and to which the shank 12 of the fastener 10 is similar, and a head 20', to which the head 20 of the fastener 10 is similar except that the torque-absorbing ribs 80 of the fastener 10 differ from the torque-absorbing ribs 80' of the fastener 10'. The head 20' has a bearing portion 70', which has an annular, peripheral edge 72', and a clamping surface 74', which flares outwardly toward the tapered tip (not shown) of the shank 12'. The clamping surface 74' defines a conical angle of about 5° relative to a plane perpendicular to the axis defined by the shank 12'. Each rib 80' projects from the clamping surface 74' and defines a ridge 86' having a flank angle of about 90° and extending in a radial plane including the axis defined by the shank 12'.

As significant differences between the ribs 80 and the ribs 80', the ridges 86' of the ribs 80' lie on an imaginary, frusto-conical surface flaring outwardly from the shank 12', toward the tapered tip (not shown) of the shank 12', defining a conical angle of about 4° relative to a plane perpendicular to the axis defined by the shank 12', and defining a conical angle of about 1° relative to the clamping surface 74. In sharp contrast, as described above, the ridges 86 of the ribs 80 lie on an imaginary, frusto-conical surface flaring outwardly from the shank 12, toward the tapered tip 22, defining a conical angle of about 1° relative to a plane perpendicular to the axis defined by the shank 12, and defining a conical angle of about 4° relative to the clamping surface 74.

Furthermore, the fastener 10' is manufactured so that each rib 80' of the fastener 10' extends from the shank 12' toward the peripheral edge 72' of the bearing portion 70' but does not necessarily extend fully to the peripheral edge 72'. As a practical matter, an imaginary circle including the distal ends of the ribs 80' may have a diameter in a range from about ninety-five percent to about one hundred percent of the diameter of the peripheral edge 72'. In sharp contrast, as described above, each rib 80 of the fastener 10 extends from the shank 12 fully to the peripheral edge 72 of the bearing portion 70. The ribs 80' of the fastener 10' tend to scrape the underlaying surface of a faying plate (not shown) and to leave a non-uniform pattern of depressed grooves and raised ribs.

In actual tests of otherwise similar fasteners from one or more samples of fasteners similar to the fastener 10' and from one or more samples of fasteners similar to the fastener 10, it was found that the tested fasteners similar to the fastener 10' and the tested fasteners similar to the fastener 10 exhibited similar values of statistical maximum tapping torque. However, it was found that the tested fasteners similar to the fastener 10' exhibited an average (mean) stripping torque of 49.80 lb.-in. and a statistical minimum stripping torque of 39.40 lb.-in., whereas it was found that the tested fasteners similar to the fastener 10 exhibited an average (mean) stripping torque of 52.80 lb.-in. and a statistical minimum stripping torque of 44.87 lb.-in. Thus, as contrasted with the tested fasteners similar to the fastener 10', it was found that the tested fasteners similar to the fastener 10 exhibited about a six percent increase in average (mean) stripping torque and about a fourteen percent increase in statistical minimum stripping torque. These data demonstrate that fasteners similar to the fastener 10 are superior to fasteners similar to the fastener 10'.

Various modifications may be made in the preferred embodiment described above without departing from the scope and spirit of this invention.

We claim:

1. A fastener for fastening a faying plate to a tapping plate, the fastener being adapted to be rotatably driven, the fastener having a shank including a tapered tip, the shank defining an axis of the fastener and having a thread extending along and around the shank, the fastener having a head unitary with the shank, the head having a driving portion and a bearing portion adjoining the shank, the driving portion being adapted to be rotatably driven so as to drive the fastener rotatably about the axis defined by the shank, the bearing portion having a peripheral edge and a clamping surface facing the shank, the peripheral edge being annular, the clamping surface flaring outwardly from the shank, toward the tapered tip, the clamping surface being frusto-conical and defining a conical angle of about 5° relative to a plane perpendicular to the axis defined by the shank, the head having torque-absorbing ribs projecting from the clamping surface of the bearing portion and spaced at regular intervals about the axis defined by the shank, each rib having a leading flank and a trailing flank with the leading and trailing flanks defining a flank angle of about 90° and with the leading and trailing flanks defining a ridge, wherein the ridges of the ribs lie on an imaginary, frusto-conical surface flaring outwardly toward the shank at a conical angle of about 1° relative to a plane perpendicular to the axis defined by the shank and at a conical angle of about 4° relative to the clamping surface of the bearing portion, and wherein each rib has a depth not less than about 0.0001 inch when measured from the clamping surface of the bearing portion to the ridge of said rib, in a plane comprising the axis defined by the shank, at the peripheral edge of the bearing portion.

2. The fastener of claim 1 wherein the ridge of each rib lies in a radial plane.

3. The fastener of claim 2 wherein the head has eight said ribs projecting from the clamping surface of the bearing portion.

4. A fastener for fastening a faying plate to a tapping plate, the faying plate being pre-punched with a clearance hole and having a faying surface and an opposite surface facing the tapping plate and the tapping plate being pre-punched with a tapping hole smaller than the clearance hole, the fastener being adapted to be rotatably driven, the fastener having a shank including a tapered tip, the shank defining an axis of the fastener and having a self-tapping thread extending along and around the shank, the shank being adapted to pass freely through the clearance hole, to enter the tapping hole at the tapered tip, and to tap a complementary thread around the tapping hole, via the self-tapping thread, when the fastener is driven rotatably, the fastener having a head unitary with the shank, the head having a driving portion and a bearing portion adjoining the shank, the driving portion being adapted to be rotatably driven so as to drive the fastener rotatably about the axis defined by the shank, the bearing portion having a peripheral edge and a clamping surface facing the shank, the peripheral edge being annular, the clamping surface flaring outwardly from the shank, toward the tapered tip, the clamping surface being frusto-conical, the head having torque-absorbing ribs projecting from the clamping surface of the bearing portion and spaced at regular intervals about the axis defined by the shank, each rib having a leading flank and a trailing flank with the leading and trailing flanks defining a flank angle of about 90° and with the leading and trailing flanks defining a ridge, wherein the ridges of the ribs lie on an imaginary, frusto-conical surface flaring outwardly toward the shank, and wherein each rib has a depth not less than about 0.0001 inch when measured from the clamping surface of the bearing portion to the ridge of said rib, in a plane comprising the axis defined by the shank, at the peripheral edge of the bearing portion.

5. The fastener of claim 4 wherein the clamping surface of the bearing portion is frusto-conical at a conical angle of about 5° relative to a plane perpendicular to the axis defined by the shank.

6. The fastener of claim 5 wherein the ridge of each rib lies in a radial plane.

7. The fastener of claim 6 wherein the head has eight said ribs projecting from the clamping surface of the bearing portion.

8. A fastener for fastening a faying plate to a tapping plate, the faying plate being pre-punched with a clearance hole and having a faying surface and an opposite surface facing the tapping plate and the tapping plate being pre-punched with a tapping hole smaller than the clearance hole, the fastener being adapted to be rotatably driven, the fastener having a shank including a tapered tip, the shank defining an axis of the fastener and having a self-tapping thread extending along and around the shank, the shank being adapted to pass freely through the clearance hole, to enter the tapping hole at the tapered tip, and to tap a complementary thread around the tapping hole, via the self-tapping thread, when the fastener is driven rotatably, the fastener having a head unitary with the shank, the head having a driving portion and a bearing portion adjoining the shank, the driving portion being adapted to be rotatably driven so as to drive the fastener rotatably about the axis defined by the shank, the bearing portion having a peripheral edge and a clamping surface facing the shank, the peripheral edge being annular, the clamping surface flaring outwardly from the shank, toward the tapered tip, the clamping surface being frusto-conical and defining a conical angle of about 5° relative to a plane perpendicular to the axis defined by the shank, the head having torque-absorbing ribs projecting from the clamping surface of the bearing portion and spaced at regular intervals about the axis defined by the shank, each rib having a leading flank and a trailing flank with the leading and trailing flanks defining a flank angle of about 90° and with the leading and trailing flanks defining a ridge, wherein the ridges of the ribs lie on an imaginary, frusto-conical surface flaring outwardly toward the shank at a conical angle of about 1° relative to a plane perpendicular to the axis defined by the shank and at a conical angle of about 4° relative to the clamping surface of the bearing portion.

9. The fastener of claim 8 wherein the clamping surface of the bearing portion is frusto-conical at a conical angle of about 5° relative to a plane perpendicular to the axis defined by the shank.

10. The fastener of claim 9 wherein the ridge of each rib lies in a radial plane.

11. The fastener of claim 10 wherein the head has eight said ribs projecting from the clamping surface of the bearing portion.

\* \* \* \* \*